United States Patent [19]

Bernelin et al.

[11] Patent Number: 4,471,025

[45] Date of Patent: Sep. 11, 1984

[54] EPOXY RESIN AND NOVAL CROSS-LINKING AGENT THEREFOR

[75] Inventors: Daniel Bernelin, Ris Orangis; Jacques Meyer, Paris, both of France

[73] Assignee: Chloe Chimie, Puteaux, France

[21] Appl. No.: 558,584

[22] Filed: Dec. 6, 1983

Related U.S. Application Data

[63] Continuation of Ser. No. 333,687, Dec. 23, 1981, abandoned, which is a continuation of Ser. No. 215,245, Dec. 11, 1980, abandoned, which is a continuation of Ser. No. 18,303, Mar. 7, 1979, abandoned.

[30] Foreign Application Priority Data

Mar. 8, 1978 [FR] France ............................... 78 06608

[51] Int. Cl.³ ........................ C08L 67/00; C08L 63/00
[52] U.S. Cl. .................................. 428/413; 525/418; 525/438; 525/533
[58] Field of Search ....................... 525/533, 418, 438; 428/413, 418

[56] References Cited

U.S. PATENT DOCUMENTS

| 2,947,717 | 8/1960 | Belanger | 260/835 |
| 3,062,770 | 11/1962 | Hirsch | 260/835 |
| 3,182,073 | 5/1965 | Loncrini | 528/273 |
| 3,188,362 | 6/1965 | Delmonte | 260/835 |
| 3,269,975 | 8/1966 | Lee | 528/365 |
| 3,431,237 | 3/1969 | Harry | 260/830 R |
| 3,437,671 | 4/1969 | Sandler | 260/835 |
| 3,468,824 | 9/1969 | Williams | 260/830 R |
| 3,555,111 | 1/1971 | Benham | 260/830 R |
| 4,176,143 | 11/1979 | Kraft | 525/533 |

*Primary Examiner*—Paul Lieberman
*Attorney, Agent, or Firm*—Burns, Doane, Swecker & Mathis

[57] ABSTRACT

A composition of matter including (i) an epoxy resin and (ii) a cross-linking agent therefor, said cross-linking agent being the reaction product of trimellitic anhydride with a diol, and wherein such reaction the molar ratio anhydride/diol is not in excess of 2, is a useful binder for coating compositions, notably the powder paints.

15 Claims, No Drawings

EPOXY RESIN AND NOVAL CROSS-LINKING AGENT THEREFOR

This application is a continuation, of application Ser. No. 333,687, filed Dec. 23, 1981 which is a continuation of application Ser. No. 215,245, filed Dec. 11, 1980, which in turn is a continuation of application Ser. No. 018,303, filed Mar. 7, 1979, all now abandoned.

BACKGROUND OF THE INVENTION

1. Field of the Invention

The present invention relates to novel compositions of matter useful as binders for powder paints, and, more especially, to such compositions comprising an epoxy resin and a cross-linking agent which comprises a certain dianhydride bearing ester functions.

2. Description of the Prior Art

In the U.S. Pat. No. 4,024,111 to Thomas et al., and copending application for reissue, Ser. No. 885,107, filed Mar. 9, 1978, both assigned to the assignee hereof and both hereby expressly incorporated by reference in their entireties and relied upon, there is described a certain cross-linking agent comprising a dianhydride with ester functions, said cross-linking agent being the product of the reaction between trimellitic anhydride and a diol, at elevated temperatures, and wherein such reaction the molar ratio of the trimellitic anhydride to the diol is not in excess of two, and preferably is between 2/1 and 2/1.5. Compositions comprised of such cross-linking agent and a saturated polyester having terminal hydroxy groups are eminently well suited as binders for powder paints.

SUMMARY OF THE INVENTION

It has now surprisingly been found that the cross-linking agent described in said '111 patent, when formulated with at least one saturated epoxy resin, too is eminently well suited as a binder for powder paints.

DETAILED DESCRIPTION OF THE INVENTION

More particularly, the novel compositions of the invention preferably comprise a saturated epoxy resin that is a known condensation product of a diphenol, such as 2,2-(4-hydroxyphenyl-propane, and an epihalohydrin, such as epichlorohydrine, the molar ratio of the epichlorohydrin to the diphenol typically being between 1.2 and 1.5, said resins themselves being prepared by processes conventional to the art. More generally other epoxy type resins may be used in the same way.

The epoxy resins comprising the compositions of the invention are solids having melting points, as measured by the ball and ring method, between 50° C. and 120° C., preferably between 70° C. and 100° C., and epoxy numbers between 400 and 1500, preferably between 500 and 1000. Such resins are readily commercially available.

Purely by way of example, representative resins are those epoxy resins having epoxy numbers between 850 and 950, such as described by S. T. Harris in *The Technology of Powder Coatings*, Portcullis Press, London, pp. 16-17 [1976], e.g., those resins commercially marketed by Ciba-Geigy Co. under the designation "ARALDITE 7004", the "DER 664 U" resins marketed by Dow and the resins marketed by Shell Chemical Co. under the designation "EPIKOTE 1004".

The cross-linking agent of the present invention is the '111 patent dianhydride bearing ester functions. Said cross-linking agent is the product of reaction between trimellitic anhydride and a diol in a molar ratio preferably between 2/1 and 2/1.5. The diol is preferably ethylene glycol. The cross-linking agent has a softening point between 70° and 120° C., preferably between 80° C. and 100° C., preferably an acid number in aqueous medium between 390 and 540 and an acid number in alcoholic medium preferably between 250 and 320. The cross-linking agent is advantageously prepared by reaction of trimellitic anhydride with the diol at a temperature comprised between 180° C. and 250° C., for a period of time until no further water is liberated.

The compositions of the invention are cross-linked by polyaddition and polycondensation at temperatures between 140° and 200° C., for from 5 to 40 minutes.

In the powder coatings according to the invention, the epoxy resin and the cross-linking agent therefor are present in respective amounts such that there exists an essentially stoichiometric equilibrium between the reactive functional groups characterizing the two components.

The powder coatings according to the invention contain, in addition to the aforementioned binders, spreading or dispersing agents [to modify surface tension] in amounts between 0.1 and 1% by weight of the composition, such as acrylic polymers, and those topical additives known to the paint industry, such as pigments, colorants and fillers.

The powder coatings according to the invention are prepared simply by mixing the components in any order or combination. For example, the resin and the cross-linking agent may be premixed by means of a fusion operation at a temperature generally less than 120° C., and preferably less than 100° C., for a short period of time, by means of an internal mixer, an extruder or an apparatus of the Buss type, followed by cooling and crushing of the binder; then, the additives are added, if desired, in a mixing operation, in the dry state, to be followed by another fusion mixing operation, as above described. Similarly, various other components may be mixed together prior to the final fusion/mixing operation. It is generally preferred to mix together in the dry state all of the solid components and then to homogenize same by fusion of the organic components. The product resulting from the fusion is then crushed, ground and screened to a particle size not exceeding, in general, 100 microns. The mixtures obtained in this manner are applied by any of the known methods or techniques, such as fluid bed application, electrostatic atomization, etc., to previously degreased, heat resistant substrates or surfaces, such as metals or ceramics followed by cross-linking at temperatures of from about 150° to 220° C., for 5 to 40 minutes. The average thickness of a coating thus applied to a given substrate is typically between 30 and 120 microns.

The compositions of the invention provide coatings having excellent mechanical properties, such as impact resistance, bending strength, etc., together with good chemical properties, such as resistance to solvents.

The powder paints of the invention are broadly useful in the automotive industry, the construction industry, the agricultural machine industry, etc., or for any other application involving the coating of metallic surfaces and substrates.

In order to further illustrate the present invention and the advantages thereof, the following specific examples are given, it being understood that the same are intended only as illustrative and in nowise limitative; unless otherwise indicated, all parts are given in parts by weight.

EXAMPLE 1

In this example, the epoxy resin employed was an Araldite 7004 resin, marketed by the Ciba-Geigy Company.

The cross-linking agent was prepared by the reaction of 384 g (2 moles) of trimellitic anhydride with 77.5 g (1.25 mole) ethylene glycol. The trimellitic anhydride was first introduced into a reactor flushed with nitrogen, said reactor being heated to 230° C., then the ethylene glycol was progressively introduced while maintaining the temperature in the reactor by means of external cooling. Two hours after the completion of the addition, no further water was evolving. The product was cast, cooled and ground.

The properties of the product obtained were as follows:

| (i) Acid Number in aqueous medium | 463 |
|---|---|
| (ii) Acid Number in alcoholic medium | 284 |
| (iii) Melting Point (by ball and ring method) | 90° C. |
| The following coating composition was prepared: | |
| (i) Araldite 7004 resin | 100 parts |
| (ii) Cross-linking Agent as prepared hereinabove | 25 parts |
| (iii) TiO₂, Rutile* | 50 parts |
| (iv) Spreading agent** | 2 parts |

*Rutile titanium oxide - Kronos CL 220, marketed by Societe Industrielle du Titane
**Acronal 4 F, marketed by the BASF Company The powder components were mixed together, intimately, then the mixture was extruded on a Buss mixer at a temperature of 100° C. The mixture was cooled, finely ground and then screened through a sieve having a mesh size of 100 microns.

The resulting powder was applied, by means of an electrostatic gun (trademark SAMES), to a steel plate (previously degreased) having the dimensions of 20 cm×10 cm×0.08 cm. The coating was then cured for 25 minutes at 200° C.

After cooling, the following properties of the coating layer were measured:

| (a) Impact Strength | measured by NFT Standard 30039 |
|---|---|
| (b) Erichsen Drawing | measured by NFT Standard 30019 |
| (c) ASTM Bending | measured by ASTM Standard D 522-60 |
| (d) Persoz Hardness (seconds) | measured by NFT Standard 30016 |
| (e) MEK test | a drop of methylethylketone is placed on tne coating, the situs scratched with a finger nail and the time required to remove the coating noted, in minutes. |

The results of such measurements are compiled in the table which follows:

TABLE

| Composition | Thickness in μ | Erichsen Draw test | Impact Strength kg/cm | ASTM Bend test kg/cm | | | Persoz Hardness sec. | MEK test |
|---|---|---|---|---|---|---|---|---|
| | | | | e μ | E % | φ mm | | |
| of Example 1 | 50 | 8 | 100 | 50 | 32 | 3 | 229 | >3 |
| of Example 2 | 50 | 9 | 100 | 50 | 32 | 3 | 237 | >3 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

EXAMPLE 2

In this example use was made of the same epoxy resin as in the example 1.

The cross-linking agent was prepared in the manner as this of the example 1 except that the trimellitic anhydride/ethylene glycol molar ratio was 2/1.5. The thus obtained cross-linking agent had the following characteristics:

| (i) | Acid number in aqueous medium | 390 |
|---|---|---|
| (ii) | Acid number in alcoholic medium | 250 |
| (iii) | Melting point (by ball and ring method) | 100° C. |

In the same manner as example 1, a powder paint is prepared. The composition of which was as follows:

| (i) | Araldite 7004 resin | 100 parts |
|---|---|---|
| (ii) | Cross-linking agent as prepared hereinabove | 25 parts |
| (iii) | TiO₂ rutile* | 50 parts |
| (iv) | Spreading agent** | 2 parts |

* and **: see example 1.

The composition was applied in the same manner as in example 1 on a steel plate. After cooling the following properties of the coating layer were measured and the results are compiled in the table.

What is claimed is:

1. A composition of matter comprising (i) an epoxy resin having more than one 1,2-epoxy group per molecule and (ii) a cross-linking agent therefore comprising a dianhydride bearing ester functions, the amounts of (i) and (ii) in said composition being sufficient to achieve an essentially stoichiometric equilibrium between the reactive functional groups characterizing said two components, said cross-linking agent having a softening point between about 70° and about 120° C. and being prepared by a direct esterification reaction between trimellitic anhydride and ethylene glycol thereby liberating water, said esterification reaction being conducted at temperatures between about 180° and about 250° C. until no further water is liberated with said cross-linking agent being essentially free of hydroxy groups and having an acid number in aqueous medium between about 390 and 540 and an acid number in alcoholic medium between about 250 and 320, and wherein such reaction the molar ratio of the trimellitic anhydride to the ethylene glycol is from 2/1 to about 2/1.5.

2. The composition of matter as defined by claim 1, said epoxy resin (i) being a saturated epoxy resin having an epoxy number between 400 and 1500 and a melting point between 50° C. and 120° C.

3. The composition of matter as defined by claim 2, said epoxy resin having an epoxy number between 500 and 1000 and a melting point between 70° C. and 100° C.

4. The composition of matter as defined by claims 1, said epoxy resin (i) being the condensation product of a diphenol with an epihalohydrin.

5. The composition of matter as defined by claim 1, said epoxy resin (i) being the condensation product of 2,2-(4-hydroxyphenyl)-propane with epichlorohydrin.

6. The composition of matter as defined by claim 1, further comprising a member selected from the group consisting of a spreading agent, a pigment, a colorant, a filler, and admixtures thereof.

7. A coating composition comprising that composition of matter as defined by claim 1.

8. The coating composition as defined by claim 7, which comprises a powder paint.

9. A cross-linked polymer comprising the reaction product of that composition of matter as defined by claim 1.

10. The cross-linked polymer as defined by claim 9, said reaction having been conducted at 150° C. to 220° C., for from 5 to 40 minutes.

11. A coated substrate, the coating comprising the cross-linked polymer as defined by claim 9.

12. The coated substrate as defined by claim 11, the coating comprising a powder paint and the substrate being a member selected from the group consisting of a metal and a ceramic.

13. A coated substrate, the coating comprising the composition of matter as defined by claim 1.

14. The coated substrate as defined by claim 13, the coating comprising a powder paint and the substrate being a member selected from the group consisting of a metal and a ceramic.

15. The composition of matter as defined by claim 1, said epoxy resin (i) having an epoxy number between 850 and 950, and said cross-linking agent (ii) having a melting point between 80° C. and 100° C.

* * * * *